United States Patent
Wang et al.

(10) Patent No.: US 12,367,390 B2
(45) Date of Patent: *Jul. 22, 2025

(54) METHOD AND DEVICE FOR STUDENT TRAINING NETWORKS WITH TEACHER NETWORKS

(71) Applicant: Beijing Tusen Zhitu Technology Co., Ltd., Beijing (CN)

(72) Inventors: Naiyan Wang, Beijing (CN); Zehao Huang, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 176 days.

This patent is subject to a terminal disclaimer.

(21) Appl. No.: 18/190,874

(22) Filed: Mar. 27, 2023

(65) Prior Publication Data

US 2023/0229920 A1    Jul. 20, 2023

Related U.S. Application Data

(63) Continuation of application No. 16/004,363, filed on Jun. 9, 2018, now Pat. No. 11,625,594.

(30) Foreign Application Priority Data

Jun. 15, 2017 (CN) .......................... 201710454691.6

(51) Int. Cl.
  *G06N 3/08* (2023.01)
  *G06N 3/04* (2023.01)
  (Continued)

(52) U.S. Cl.
  CPC ................ *G06N 3/08* (2013.01); *G06N 3/04* (2013.01); *G06N 3/045* (2023.01); *G06N 20/10* (2019.01)

(58) Field of Classification Search
  CPC ....................................................... G06N 20/10
  See application file for complete search history.

(56) References Cited

U.S. PATENT DOCUMENTS 8,392,117 B2  3/2013  Dolgov
8,788,134 B1  7/2014  Litkouhi
(Continued)

FOREIGN PATENT DOCUMENTS

| | | |
|---|---|---|
| CN | 105787513 A | 7/2016 |
| CN | 106355248 A | 1/2017 |
| WO | 2016145379 A1 | 9/2016 |

OTHER PUBLICATIONS

Kim et al. "Sequence-Level Knowledge Distillation", pp. 11, arXiv:1606.07947v4 [cs.CL] Sep. 22, 2016.*
(Continued)

*Primary Examiner* — Li Wu Chang
(74) *Attorney, Agent, or Firm* — Perkins Coie LLP

(57) ABSTRACT

A method and device for training a neural network are disclosed. The method comprises: selecting, by a training device, a teacher network performing the same functions of a student network; and iteratively training the student network and obtaining a target network, through aligning distributions of features between a first middle layer and a second middle layer corresponding to the same training sample data, so as to transfer knowledge of features of a middle layer of the teacher network to the student network.

18 Claims, 2 Drawing Sheets

(51) Int. Cl.
G06N 3/045 (2023.01)
G06N 20/10 (2019.01)

(56) References Cited

U.S. PATENT DOCUMENTS

2018/0268292 A1 9/2018 Choi et al.
2018/0036556 A1 12/2018 Naiyan et al.

OTHER PUBLICATIONS

Chinese Patent Office, Fourth Office Action for CN 201710454691.6, Mailing Date: Jun. 16, 2020, 11 pages with English translation.
Chinese Patent Office, Third Office Action for CN 201710454691.6, Mailing Date: Feb. 25, 2020, 10 pages with English translation.
Chinese Patent Office, Second Office Action for CN 201710454691.6, Mailing Date: Oct. 21, 2019, 8 pages with English translation.
Chinese Patent Office, First Office Action for CN 201710454691.6, Mailing Date: May 8, 2019, 9 pages with English translation.
Romero et al., "FitNets: Hints for Thin Deep Nets," Mar. 27, 2015, arXiv:1412.6550v4 [cs.LG], ICLR 2015, pp. 1-13 (Year: 2015).
Gretton et al., "A Kernel Two-Sample Te st," 2012 , Journal of Machine Learning Research 13 , pp. 723-773 (Year: 2012).
Hinton, Geoffrey, Vinyals, Oriol, and Dean, Jeff, "Distilling the Knowledge in a Neural Network", Cornell University, Library, arXiv:1503_02531 [statML], Mar. 9, 2015.
Adriana Romero, Nicolas Ballas, Samira Ebrahimi Kahou, Antoine Chassang, Carlo Gatta & Yoshua Bengio, Fitnets: Hints for Thin Deep Nets, Cornell University Library, arXiv:14126550 [cs.LG], Published as a conference paper at ICLR 2015, Mar. 27, 2015.
Zagoruyko, Sergey and Komodakis, Nikos, "Paying More Attention to Attention: Improving the Performance of Convolutional Neural Networks Via Attention Transfer", Universit'e Paris-Est, Ecole des Pants ParisTech, Paris, France, Published as a conference paper at ICLR 2017, arXiv:1612.03928v3 [cs.CV] Feb. 12, 2017.

* cited by examiner

METHOD AND DEVICE FOR STUDENT TRAINING NETWORKS WITH TEACHER NETWORKS

CROSS-REFERENCES TO RELATED APPLICATIONS

This application is a continuation of U.S. patent application Ser. No. 16/004,363, filed on Jun. 9, 2018, which claims priority to and benefit of Chinese Patent Application No. 201710454691.6, filed with the Chinese Patent Office on Jun. 15, 2017, entitled "METHOD AND DEVICE FOR TRAINING NEURAL NETWORK", all of which are hereby incorporated by reference in their entireties.

FIELD

The present application relates to the computer vision field, and particularly to a method and a device for training a neural network.

BACKGROUND

In recent years, deep neural networks have achieved great success in various applications in computer vision, such as image classification, object detection, semantic segmentation and so on. However, models of deep neural network are hardly deployed in device with low power consumption and low computation ability for real-time computation (such as embedded device, integrated device, and so on), as these the models usually contain a large number of model parameters, require large computational resource and cause slow inference speed.

In the light of the issues described above, a lot of methods for accelerating deep neural networks have been proposed recently, such as network pruning, network weight quantization, network knowledge distillation and so on.

Although methods like network pruning and network quantization, except neuron pruning, can effectively decrease the number of parameters included in neural networks, they are not able to fully exploit modern GPU and deep learning frameworks; and their accelerations need specific hardware or implementations. Comparatively, knowledge distillation, which uses the extra information provided by teacher networks (featuring a large amount of network parameters, high performance and low-speed computation) to train student networks (featuring a small amount of network parameters, poor performance and high-speed computation) directly, can practically accelerate deep neural networks with existing frameworks. Therefore, knowledge distillation is a more commonly used method for acceleration of neutral networks nowadays.

At present, there are three main methods of knowledge distillation, which are "Knowledge Distill" (KD) proposed by Hinton et al. in *Distilling the Knowledge in a Neural Network* in 2014, "FitNets" proposed by Romero et al. in *Fitnets: Hints for Thin Deep Nets* in 2015, and "Attention Transfer" (AT) put forward by Sergey et al. in *Paying More Attention to Attention: Improving the Performance of Convolutional Neural Networks via Attention Transfer* in 2016.

To refer the teacher network to T and the student network to S, we can formulate the objective function of student network in KD as Equation (1):

$$\mathcal{L}_{KD} = \mathcal{H}(y_{true}, p_S) + \lambda \mathcal{H}\left(\text{softmax}\left(\frac{l_T}{\tau}\right), \text{softmax}\left(\frac{l_S}{\tau}\right)\right) \quad \text{Equation (1)}$$

In Equation (1), $\mathcal{H}(\cdot)$ represents the cross-entropy loss function, $y_{true}$ represents the training label, $p_S = \text{softmax}(l_S)$ refers the classification probability of the student network S, $l_T$ and $l_S$ refers to the output value of network T and S before softmax (known as logits) respectively, $\tau$ is a preset value (called temperature), and $\lambda$ refers to the weight of transfer loss.

As shown in the second item of Equation (1), the basic idea of KD is to distill knowledge from a large teacher model into a small one by learning the class distribution provided by the teacher via softened softmax.

Different from KD, in order to learn from the intermediate representations of teacher network, FitNet makes the student mimic the full feature maps of the teacher. The objective function of student network is formulated as equation (2) below:

$$\mathcal{L}_{FitNet} = \mathcal{H}(y_{true}, p_S) + \lambda \|F_T - \mathcal{R}(F_S)\|_2^2 \quad \text{Equation (2)}$$

In Equation (2), $F_T \in \mathbb{R}^{C_T \times HW}$ and $F_S \in \mathbb{R}^{C_S \times HW}$ refers to the feature map of a certain layer of teacher network and student network respectively; $C_T$ and $C_S$ refers to the number of channels of $F_T$ and $F_S$ respectively; H and W refers the height and the width of a feature map respectively; generally, the heights and widths of the feature maps of $F_T$ and $F_S$ are the same; if the heights and widths of the feature maps of $F_T$ and $F_S$ do not match, they should be processed to be the same by some simple difference functions or algorithms; $\mathcal{R}(\cdot)$ refers to a convolution with a 1*1 kernel; S represents the number of channels of feature maps of $F_S$, T represents the number of channels of feature maps of $F_T$, and $\mathcal{R}(\cdot)$ is used to reconcile the number of channels of feature map of $F_T$ and $\mathcal{R}(F_S)$.

By aligning the features of middle layers of teacher network and student network, FitNet transfers the specific knowledge from the teacher network into the student network, and then improve the performance of the student network.

Similar to FitNet in principle, AT can improve the performance of student network by transferring the knowledge regarding the attention map of teacher network to the student network. The objective function of student network is defined by Equation (3) below:

$$\mathcal{L}_{AT} = \mathcal{H}(y_{true}, p_S) + \lambda \|\mathcal{A}(F_T) - \mathcal{A}(F_S)\|_2^2 \quad \text{Equation (3)}$$

In equation (3), $\mathcal{A}(\cdot)$ refers to a normalized projection function of attention map. Among all its definitions, the simplest definition of $\mathcal{A}(\cdot)$ is found in equation (4):

$$\mathcal{A}(F) = \frac{\sum_{i=1}^{C} |f^{k\cdot}|}{\left\|\sum_{i=1}^{C} |f^{k\cdot}|\right\|_2} \quad \text{Equation (4)}$$

In Equation (4), $f^{k\cdot} \in \mathbb{R}^{HW}$ refers to the vectorized feature map of the k-th channel of F.

Notes on Terminology

Teacher network: a high-performance neural network used for providing more accurate supervision information to student network in the process of knowledge transfer.

Student Network: a poor-performance single neural network with fast computation speed, which can be deployed in actual application scenes with stricter real-time requirements; it is of smaller computational cost and fewer model parameters, compared to teacher network.

BRIEF SUMMARY

In an aspect, embodiments of the present application provides a method for training a neural network, the method including:

selecting, by a training device, a teacher network performing the same functions of a student network; and, iteratively training the student network and obtaining a target network, through aligning distributions of features between a first middle layer and a second middle layer corresponding to the same training sample data, so as to transfer knowledge of features of a middle layer of the teacher network to the student network; wherein, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

In another aspect, embodiments of the present application further provide a device for training a neural network, the device including:

a selecting element, configured to select a teacher network performing the same functions of a student network; and a training element, configured to iteratively train the student network and obtain a target network through aligning distributions of features of a first middle layer and a second middle layer corresponding to the same training sample data, so as to transfer knowledge of features of a middle layer of the teacher network into the student network; wherein, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

In another aspect, embodiments of the present application further provide a device for training a neural network, the device including: a processor and at least one memory, the at least one memory storing at least one machine executable instruction, which is executed by the processor to:

select a teacher network performing the same functions of a student network; and, iteratively train the student network and obtain a target network, through aligning distributions of features between a first middle layer and a second middle layer corresponding to the same training sample data, so as to transfer knowledge of features of a middle layer of the teacher network to the student network; wherein, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

BRIEF DESCRIPTION OF THE DRAWINGS

The accompanying drawings are used to provide the further understanding of the present application and constitute a part of the specification, and serve to explain the present application together with the embodiments of the present application but not limit the present application.

DETAILED DESCRIPTION OF THE EMBODIMENTS

In order to make those of ordinary skill in the art better able to understand the technical solution in the present application, the technical solution in the embodiments of the present application will be described clearly and completely below in combination with the accompanying drawings. The described embodiments are just a part of the embodiments of the present application but not all the embodiments. Based upon the embodiments of the present application, all of other embodiments obtained by those of ordinary skill in the art without creative work should pertain to the protection scope of the present application.

There are a couple of technical defects in the prior art: KD could only be applied in classification tasks with softmax layers and could not be applied in regression tasks; and even when performing a classification task, KD often fail to provide sufficient knowledge to student network if there are only a small number of classes. FitNet is so strict about directly aligning features of middle layers, that it could not be effectively combined with other methods to train and obtain high-performance student networks. Student networks trained and obtained through AT often perform poorly. Therefore, the student networks trained through the existing knowledge transfer methods cannot reconcile broad application range and accuracy.

As for the neural network training scheme provided by the embodiments of the present application, on one aspect, it can train and obtain student networks with a broader application range through aligning features of middle layers of teacher networks with those of student networks, and can adopt both classification models and regression models; in another aspect, it can work with other methods to further enhance the performance and the accuracy of student networks, since its constraints on aligning the distribution of features of middle layers between teacher networks and student networks are less strict than that of directly aligning all the features of middle layers, namely the methods of the prior art.

Embodiment One

Figure 1:
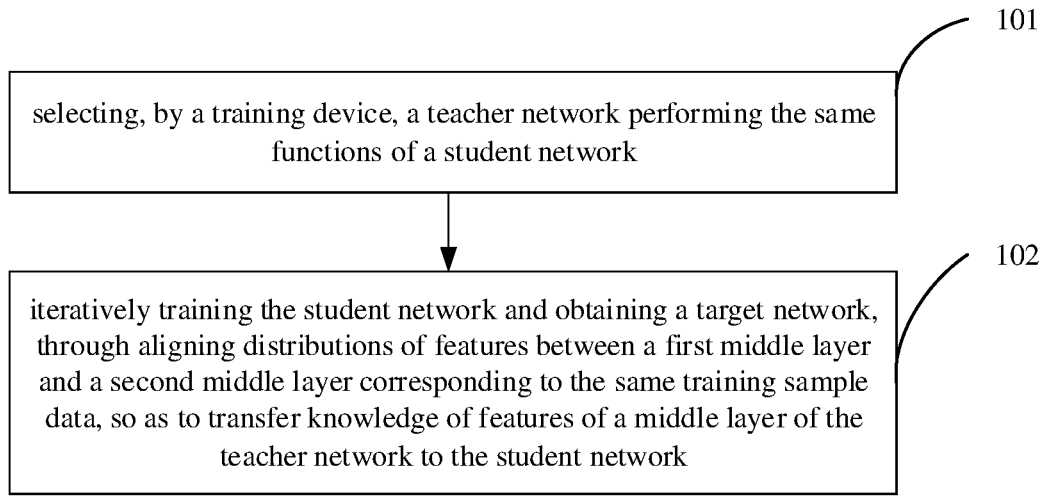
FIG. 1 is a flow chart illustrating a method for training a neural network in embodiments of the present application.

As shown in FIG. 1, a flow chart of a method for training a neural network provided by embodiments of the current application is illustrated, where the method includes:

Step 101: selecting, by a training device, a teacher network performing the same functions of a student network.

The functions include such as image classification, object detection, semantic segmentation and so on. The teacher network is characterized by high performance and high accuracy; but, compared to the student network, it has some obvious disadvantages such as complex structure, a large number of parameters and weights and low computation speed. The student network is characterized by fast computation speed, average or poor performance, and simple network structure. The high-performance teacher network with the same functions of the student network could be selected from a set of preset neural network models.

Step 102: iteratively training the student network and obtaining a target network, through aligning distributions of features between a first middle layer and a second middle layer corresponding to the same training sample data, so as to transfer knowledge of features of a middle layer of the teacher network to the student network.

Where, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

In the embodiments of the present application, the feature maps output from the first specific network layer of the teacher network is generally referred to the features of the first middle layer, after the training sample data are provided to the teacher network; the feature maps output from the second specific network layer of the student network is generally referred to the features of the second middle layer, after the training sample data are provided to the student network.

In some embodiments of the present application, the first specific network layer is a middle network layer or the last network layer of the teacher network.

In some embodiments of the present application, the second specific network layer is a middle network layer or the last network layer of the student network.

Figure 2:
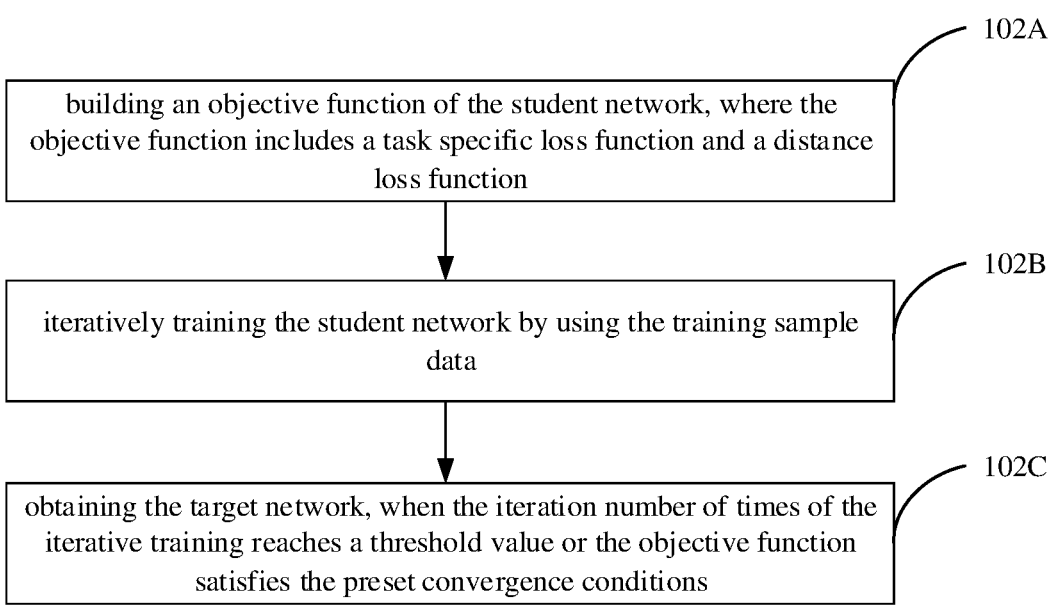
FIG. 2 is flow chart illustrating iteratively training a student network and obtaining a target network in embodiments of the present application.

In some embodiments, the step 102 described above could be implemented as the method illustrated in FIG. 2, including:

Step 102A: building an objective function of the student network, where the objective function includes a task specific loss function and a distance loss function, and the distance loss function is a function used to measure the distance between the distributions of the features of the first middle layer and the distributions of the features of the second middle layer corresponding to the same training sample data.

In embodiments of the present application, the form of the task specific loss function is related to the task of the student network. For example, when the task of the student network is a classification task, the form of the task specific loss function is a cross-entropy loss function; and when the task of the student network is a regression task, the form of the task specific loss function is a distance loss function.

Step 102B: iteratively training the student network by using the training sample data.

Step 102C: obtaining the target network, when the iteration number of training reaches a threshold or the objective function satisfies the preset convergence conditions.

As for step 102B in embodiments of the present application, the training sample data used in each iteration of training is different. Step 102B described above could be implemented as below:

iteratively training the student network for multiple times by taking the steps described below (Hereinafter referred to as the current iteration of training, where the training sample data used in the current iteration of training is referred to as the training sample data in the current iteration, and the current iteration of training includes step A, step B and step C):

step A: feeding the training sample data in the current iteration into the teacher network and the student network respectively, and obtaining the features of the first middle layer and the second middle layer corresponding to the training sample data in the current iteration;

Step B: calculating the value of the objective function according to the training sample data in the current iteration and the corresponding features of the first middle layer and the second middle layer thereto, and adjusting the weights of the student network according to the value of the objective function; and, Step C: continuing to the training of next iteration based on the weight adjusted student network.

In some embodiments, as for the aforementioned step B, adjusting the weights of the student network according to the value of the objective function could be implemented as: adjusting the weights of the student network according to the value of the objective function with a gradient descent optimization function.

In a specific embodiment, the objective function of the student network could be expressed as equation (5) below:

$$\mathcal{L} = \mathcal{H}_{(y_{true}, p_S)} + \lambda \mathcal{L}_{MMD^2(F_T, F_S)} \qquad \text{equation (5)}$$

In equation (5), $\mathcal{H}_{(y_{true}, p_S)}$ refers to the cross-entropy loss function, $\mathcal{L}_{MMD^2}(F_T, F_S)$ refers to the distance loss function, $\lambda$ refers to the weight of distance loss function, $F_T$ refers to the feature map (i.e. the features of the first middle layer) output from the first specific network layer of the teacher network given the training sample data, $F_S$ refers to the feature map (i.e. the features of the second middle layer) output from the second specific network layer of the student network given the training sample data, $y_{true}$ refers to the ground-truth, labels of the training sample data, and $p_S$ refers to the output classification probability of the student network.

$F_S \in \mathbb{R}^{C_S \times HW}$ and $F_T \in \mathbb{R}^{C_T \times HW}$ where $C_T$ refers to the number of channels of $F_T$, $C_S$ refers to the number of channels of $F_S$, and H and W represents respectively the height and the width of $F_T$ and $F_S$. The sizes of $F_T$ and $F_S$ are the same in the embodiments of the present application.

In some embodiments, between the step A and the step B, the method further includes: judging whether the heights of $F_T$ and $F_S$ are the same or not, if they are different then taking the one with a higher value as the aforementioned H; judging whether the widths of $F_T$ and $F_S$ are the same or not, and if they are different then taking the one with a higher value as the aforementioned W; and adjusting the sizes of $F_T$ and $F_S$ to be H and W by using a preset interpolating function.

In some embodiments, the $\mathcal{L}_{MMD^2}(F_T, F_S)$ in the objective function of the embodiments could be formulated in equation (6) below:

$$\frac{1}{C_T^2} \sum_{j=1}^{C_T} \sum_{j'=1}^{C_T} k\left( \frac{f_T^{j\cdot}}{\|f_T^{j\cdot}\|_2}, \frac{f_T^{j'\cdot}}{\|f_T^{j'\cdot}\|_2} \right) + \qquad \text{Equation (6)}$$

$$\frac{1}{C_S^2} \sum_{j=1}^{C_S} \sum_{j'=1}^{C_S} k\left( \frac{f_S^{j\cdot}}{\|f_S^{j\cdot}\|_2}, \frac{f_S^{j'\cdot}}{\|f_S^{j'\cdot}\|_2} \right) -$$

-continued $$\frac{2}{C_T C_S} \sum_{i=1}^{C_T} \sum_{j=1}^{C_S} k\left(\frac{f_T^{i^*}}{\|f_T^{i^*}\|_2}, \frac{f_S^{j^*}}{\|f_S^{j^*}\|_2}\right)$$

In equation (6), k(·,·) refers to a preset kernel function, $C_T$ refers to the number of channels of $F_T$, $C_S$ refers to the number of channels of $F_S$, $f_T^{i}$ represents the vectorized feature map of the i-th channel of $F_T$, $f_T^{i'}$ represents the vectorized feature map of the i'-th channel of $F_T$, $f_S^{j}$ refers to the vectorized feature map of the j-th channel of $F_S$, and $f_S^{j'}$ refers to the vectorized feature map of the j'-th channel of $F_S$.

In some embodiments, k(·,·) could be a preset linear kernel function, a preset polynomial kernel function, a preset Gaussian kernel function, or a combination of multiple preset Gaussian kernel functions, which is not strictly limited in the present application, and could be set flexibly by those of ordinary skill in the art according to actual requirements.

A specific embodiment is as follow: k(·,·) is a linear kernel function expressed as equation (7) below; or k(·,·) is a polynomial kernel function expressed as equation (8) below; or k(·,·) is a Gaussian kernel function expressed as equation (9) below.

$$k(x, y) = x^T y \quad \text{equation (7)}$$

$$k(x, y) = (x^T y + c)^d \quad \text{equation (8)}$$

$$k(x, y) = \exp\left(-\frac{\|x - y\|_2^2}{2\sigma^2}\right) \quad \text{equation (9)}$$

Embodiment Two

Figure 3:
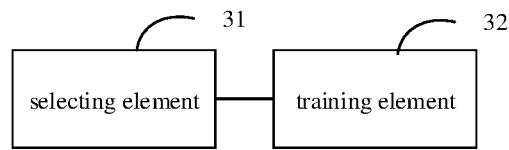
FIG. 3 is a structure schematic diagram of a device for training a neural network in embodiments of the present application.

Based upon the same concept of the method for training a neural network provided above, some embodiments of the present application further provide a device for training a neural network. The structure of the device is shown in FIG. 3, which includes:

A selecting element 31, configured to select a teacher network performing the same functions of a student network.

The functions include such as image classification, object detection, semantic segmentation and so on. The teacher network is characterized by high performance and high accuracy; but, compared to the student network, it has some obvious disadvantages such as complex structure, a large number of parameters and weights, and low computation speed. The student network is characterized by fast computation speed, average or poor performance, and simple network structure. The high-performance teacher network with the same functions of the student network could be selected from a set of preset neural network models.

In the embodiments of the application, the feature map output from the first specific network layer of the teacher network is generally referred to the features of the first middle layer, after the training sample data are provided to the teacher network; the feature map output from the second specific network layer of the student network is generally referred to the features of the second middle layer, after the training sample data are provided to the student network.

A training element 32, configured to iteratively train the student network and obtain a target network, through aligning distributions of features of a first middle layer and a second middle layer corresponding to the same training sample data, so as to transfer knowledge of features of a middle layer of the teacher network into the student network; wherein, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

In some embodiments of the application, the first specific network layer is a middle network layer or the last network layer of the teacher network; and/or, the second specific network layer is a middle network layer or the last network layer of the student network.

Figure 4:
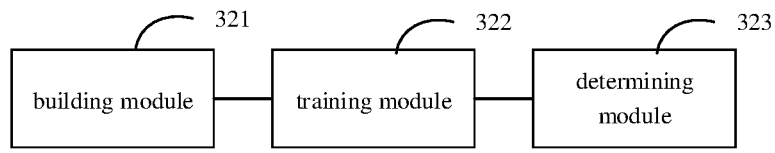
FIG. 4 is a structure schematic diagram of a training element in embodiments of the present application.

In some embodiments of the application, FIG. 4 illustrates the structure of the training element 32. The training element 32 includes a building module 321, a training module 322 and a determining module 323, where:

the building module 321 is configured to build an objective function of the student network, where the objective function includes a task specific loss function and a distance loss function, and the distance loss function is a function used to measure the distance between the distributions of the features of the first middle layer and the distributions of the features of the second middle layer corresponding to the same training sample data.

In some embodiments of the application, the form of the task specific loss function is related to the task of the student network. For example, when the task of the student network is a classification task, the form of the task specific loss function is a cross-entropy loss function; and when the task of the student network is a regression task, the form of the task specific loss function is a distance loss function.

The training module 322 is configured to iteratively train the student network using the training sample data.

The determining module 323 is configure to obtain the target network, when the iteration number of training reaches a threshold or the objective function satisfies the preset convergence conditions.

In some embodiments of the application, the training module 322 is specifically configured to:

iteratively train the student network for multiple times by taking the steps described below (Hereinafter referred to as the current iteration of training, the training sample data used in the current iteration of training is referred to as the training sample data in the current iteration, and the current iteration of training includes step A, step B and step C):

step A: feeding the training sample data in the current iteration into the teacher network and the student network respectively, and obtaining the features of the first middle layer and the second middle layer corresponding to the training sample data in the current iteration;

Step B: calculating the value of the objective function according to the training sample data in the current iteration and the corresponding features of the first middle layer and the second middle layer thereto, and adjusting the weights of the student network according to the value of the objective function; and, Step C: continuing to the training of next iteration based on the weight adjusted student network.

In some embodiments, as for the aforementioned step B, adjusting the weights of the student network according to the value of the objective function could be implemented as:

adjusting the weights of the student network according to the value of the objective function with a gradient descent optimization function.

In some embodiments, the objective function built by the building module 321 could be expressed as the equation (5) described above, the distance loss function could be expressed as the equation (6) described above, and a detailed description thereof will be omitted here.

Embodiment Three

Figure 5:
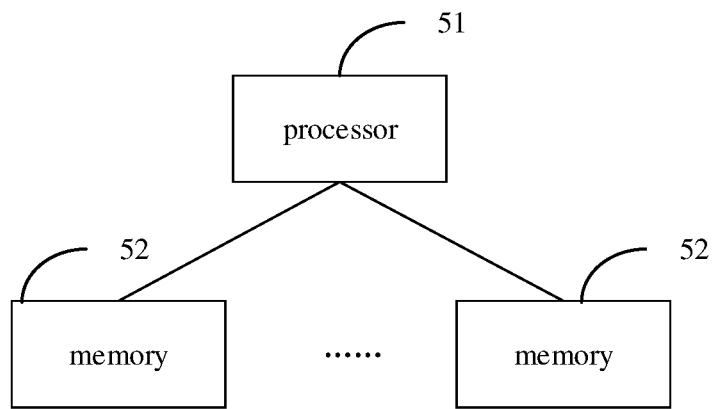
FIG. 5 is another structure schematic diagram of a device for training a neural network in embodiments of the present application.

Based upon the same concept of the method for training a neural network provided above, some embodiments of the present application further provide a device for training a neural network, the structure of the device is illustrated in FIG. 5, which including: a processor 51 and at least one memory 52, the at least one memory storing at least one machine executable instruction, which is executed by the processor to:

select a teacher network performing the same functions of a student network; and, iteratively train the student network and obtain a target network, through aligning distributions of features between a first middle layer and a second middle layer corresponding to the same training sample data, so as to transfer knowledge of features of a middle layer of the teacher network to the student network; wherein, the features of the first middle layer refer to feature maps output from a first specific network layer of the teacher network after the training sample data are provided to the teacher network, and the features of the second middle layer refer to feature maps output from a second specific network layer of the student network after the training sample data are provided to the student network.

In some embodiments, the processor 51 executes the at least one machine executable instruction to iteratively train the student network and obtain a target network, through aligning distributions of features between a first middle layer and a second middle layer corresponding to the same training sample data, the at least one machine executable instruction being executed by the processor to:

build an objective function of the student network, where the objective function includes a task specific loss function and a distance loss function, and the distance loss function is a function used to measure the distance between the distributions of the features of the first middle layer and the distributions of the features of the second middle layer corresponding to the same training sample data; iteratively train the student network by using the training sample data; obtain the target network, when the iteration number of training reaches a threshold or the objective function satisfies the preset convergence conditions.

In some embodiments, the processor 51 executes the at least one machine executable instruction to iteratively train the student network by using the training sample data, the at least one machine executable instruction being executed by the processor to:

iteratively train the student network over multiple iterations by: feeding the training sample data in a current iteration into the teacher network and the student network respectively, and obtain the features of the first middle layer and the second middle layer corresponding to the training sample data in the current iteration; calculate the value of the objective function according to the training sample data in the current iteration and the corresponding features of the first middle layer and the second middle layer thereto, and adjust the weights of the student network according to the value of the objective function; and continue the training with a next iteration based on the weight adjusted student network.

In some embodiments, the processor 51 executes the at least one machine executable instruction to adjust the weights of the student network according to the value of the objective function, the at least one machine executable instruction being executed by the processor to: adjust the weights of the student network according to the value of the objective function with a gradient descent optimization function.

In some embodiments, the objective function could be expressed as the equation (5) described above, the distance loss function could be expressed as the equation (6) described above, and a detailed description thereof will be omitted here.

In some embodiments, the first specific network layer is a middle network layer or the last network layer of the teacher network; and/or, the second specific network layer is a middle network layer or the last network layer of the student layer.

In the neural network training scheme provided by the embodiments of the application, in one aspect, the embodiments can train and obtain student networks with a broader application range through aligning features of middle layers of teacher networks with those of student networks, and can adopt both classification models and regression models; in another aspect, it can work with other methods to further enhance the performance and the accuracy of student networks, since its constraints on aligning the distribution of features of middle layers between teacher networks and student networks are less strict than that of directly aligning all the features of middle layers, namely the methods of the prior art.

It should be understood by those of ordinary skill in the art that the embodiments of the present application can provide methods, devices, systems, and computer program products. Thus, the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the box diagrams of the methods, the devices (systems) and the computer program products according to the embodiments of the present application. It should be understood that each process and/or box in the flow charts and/or the box diagrams, and a combination of processes and/or blocks in the flow charts and/or the box diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the box diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the box diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the box diagrams.

Although the preferred embodiments of the present application have been described, those of ordinary skill in the art can make additional alterations and modifications to these embodiments once they learn about the basic creative concepts. Thus, the attached claims are intended to be interpreted to include the preferred embodiments as well as all the alterations and modifications falling within the scope of the present application.

It will be appreciated that those of ordinary skill in the art can make various modifications and variations to the present application without departing from the spirit and scope of the present application. Thus, the present application is also intended to encompass these modifications and variations therein as long as these modifications and variations to the present application come into the scope of the claims of the present application and their equivalents.

What is claimed is:

1. A method for training a neural network, the method comprising:
   iteratively training a student network, through transferring knowledge of a teacher network to the student network, wherein iteratively training the student network comprises:
   building an objective function of the student network, where the objective function includes a task specific loss function and a distance loss function, and the distance loss function is a function used to measure the distance between distributions of features of a first middle layer and distributions of features of a second middle layer based on same training sample data; and
   iteratively training the student network by using the training sample data to obtain a target network, when an iteration number of training reaches a threshold or the objective function satisfies pre-defined convergence conditions,
   wherein, the task specific loss function comprises a cross-entropy loss function and the objective function of the student network comprises:

$$\mathcal{L} = \mathcal{H}_{(y_{true}, p_S)} + \lambda \mathcal{L}_{MMD^2(F_T, F_S)}$$

wherein, $\mathcal{H}_{(y_{true}, p_S)}$ refers to the cross-entropy loss function, $\mathcal{L}_{MMD^2}(F_T, F_S)$ refers to the distance loss function, $\lambda$ refers to a weight of the distance loss function, $y_{true}$ refers to a ground-truth labels of the training sample data, and $p_S$ refers to an output classification probability of the student network, $F_S \in \mathbb{R}^{C_S \times HW}$, $F_T \in \mathbb{R}^{C_T \times HW}$, $C_T$ refers to a number of channels of $F_T$, $C_S$ refers to a number of channels of $F_S$, H is a larger one of heights of $F_T$ and $F_S$, W is a larger one of widths of $F_T$ and $F_S$.

2. The method of claim 1, wherein the transferring knowledge of features of a teacher network to the student network comprises transferring knowledge of features of a middle layer of a teacher network through aligning distributions of features between a first middle layer and a second middle layer corresponding to the same training sample data.

3. The method of claim 2, wherein the features of the first middle layer refer to a feature map $F_T$ output from a first specific network layer of the teacher network, and the features of the second middle layer refer to a feature map $F_S$ output from a second specific network layer of the student network.

4. The method of claim 1, wherein the teacher network performs same functions of the student network.

5. The method of claim 1, further comprising: interpolating $F_T$ and $F_S$ according to H and W.

6. The method according to claim 1, wherein iteratively training the student network comprises:
   obtaining the features of the first middle layer and the second middle layer corresponding to a training sample data in a current iteration;
   calculating the objective function according to the training sample data in the current iteration and the corresponding features of the first middle layer and the second middle layer thereto, and adjusting weights of the student network according to the objective function; and
   continuing to the training of next iteration based on the weight adjusted student network.

7. A device for training a neural network, the device comprises a training element that is configured to
   iteratively training a student network, through transferring knowledge of a teacher network to the student network, wherein iteratively training the student network comprises:
   building an objective function of the student network, where the objective function includes a task specific loss function and a distance loss function, and the distance loss function is a function used to measure the distance between distributions of features of a first middle layer and distributions of the features of a second middle layer based on same training sample data; and
   iteratively training the student network by using the training sample data to obtain a target network, when an iteration number of training reaches a threshold or the objective function satisfies pre-defined convergence conditions,
   wherein, the task specific loss function comprises a cross-entropy loss function and the objective function of the student network comprises:

$$\mathcal{L} = \mathcal{H}_{(y_{true}, p_S)} + \lambda \mathcal{L}_{MMD^2(F_T, F_S)}$$

wherein, $\mathcal{H}_{(y_{true}, p_S)}$ refers to the cross-entropy loss function, $\mathcal{L}_{MMD^2}(F_T, F_S)$ refers to the distance loss function, $\lambda$ refers to a weight of the distance loss function, $y_{true}$ refers to a ground-truth labels of the training sample data, and $p_S$ refers to an output classification probability of the student network, $F_S \in \mathbb{R}^{C_S \times HW}$, $F_T \in \mathbb{R}^{C_T \times HW}$, $C_T$ refers to a number of channels of $F_T$, $C_S$ refers to a number of channels of $F_S$, H is a larger one of heights of $F_T$ and $F_S$, W is a larger one of widths of $F_T$ and $F_S$.

8. The device according to claim 7, wherein the teacher network performs same functions of the student network.

9. The device according to claim 7, wherein the transferring knowledge of features of a teacher network to the student network comprises transferring knowledge of features of a middle layer of a teacher network through aligning distributions of features between a first middle layer and a second middle layer corresponding to the same training sample data.

10. The device according to claim 7, wherein the features of the first middle layer refer to a feature map $F_T$ output from a first specific network layer of the teacher network, and the features of the second middle layer refer to a feature map $F_S$ output from a second specific network layer of the student network.

11. The device according to claim 7, wherein the training element, configured to iteratively train the student network for multiple times, is configured to:
   obtain the features of the first middle layer and the second middle layer corresponding to the training sample data in a current iteration;
   calculate the objective function according to the training sample data in the current iteration and the corresponding features of the first middle layer and the second middle layer thereto, and adjust weights of the student network according to the objective function; and
   continue to the training of next iteration based on the weight adjusted student network.

12. The device according to claim 10, wherein the training element is specifically configured to: adjust weights of the student network according to the objective function with a gradient descent optimization function.

13. The device according to claim 7, wherein $\mathcal{L}_{MMD^2}(F_T, F_S)$ in the objective function comprises:

$$\frac{1}{C_T^2}\sum_{k=1}^{C_T}\sum_{k'=1}^{C_T} k\left(\frac{f_T^{i\cdot}}{\|f_T^{i\cdot}\|_2}, \frac{f_T^{i'\cdot}}{\|f_T^{i'\cdot}\|_2}\right) +$$

$$\frac{1}{C_S^2}\sum_{j=1}^{C_S}\sum_{j'=1}^{C_S} k\left(\frac{f_S^{j\cdot}}{\|f_S^{j\cdot}\|_2}, \frac{f_S^{j'\cdot}}{\|f_S^{j'\cdot}\|_2}\right) -$$

$$\frac{2}{C_T C_S}\sum_{k=1}^{C_T}\sum_{j=1}^{C_S} k\left(\frac{f_T^{i\cdot}}{\|f_T^{i\cdot}\|_2}, \frac{f_S^{j\cdot}}{\|f_S^{j\cdot}\|_2}\right)$$

wherein, $k(\cdot,\cdot)$ refers to a preset kernel function, $C_T$ refers to number of channels of $F_T$, $C_S$ refers to number of channels of $F_S$, $f_T^{i\cdot}$ represents a vectorized feature map of an i-th channel of $F_T$, $f_T^{i'\cdot}$ represents a vectorized feature map of an i'-th channel of $F_T$, $f_S^{j\cdot}$ refers to a vectorized feature map of a j-th channel of $F_S$, and $f_S^{j'\cdot}$ refers to a vectorized feature map of ta j'-th channel of $F_S$.

14. The device according to claim 13, wherein $k(\cdot,\cdot)$ is a preset linear kernel function, a preset polynomial kernel function, or a preset Gaussian kernel function.

15. The device according to claim 13, wherein the training element is further configured to interpolate $F_T$ and $F_S$ according to H and W.

16. A device for training a neural network, the device comprising a processor and at least one memory, the at least one memory storing at least one machine executable instruction, which is executed by the processor to iteratively training a student network, through transferring knowledge of a teacher network to the student network, wherein iteratively training the student network comprises:
   building an objective function of the student network, where the objective function includes a task specific loss function and a distance loss function, and the distance loss function is a function used to measure the distance between distributions of features of a first middle layer and distributions of features of a second middle layer based on same training sample data; and
   iteratively training the student network by using the training sample data to obtain a target network, when an iteration number of training reaches a threshold or the objective function satisfies pre-defined convergence conditions,
   wherein, the task specific loss function comprises a cross-entropy loss function and the objective function of the student network comprises:

$$\mathcal{L} = \mathcal{H}(y_{true}, p_S) + \lambda \mathcal{L}_{MMD^2}(F_T, F_S)$$

wherein, $\mathcal{H}(y_{true}, p_S)$ refers to the cross-entropy loss function, $\mathcal{L}_{MMD^2}(F_T, F_S)$ refers to the distance loss function, $\lambda$ refers to a weight of the distance loss function, $y_{true}$ refers to a ground-truth labels of the training sample data, and $p_S$ refers to an output classification probability of the student network, $F_S \in \mathbb{R}^{C_S \times HW}$, $F_T \in \mathbb{R}^{C_T \times HW}$, $C_T$ refers to a number of channels of $F_T$, $C_S$ refers to a number of channels of $F_S$, H is a larger one of heights of $F_T$ and $F_S$, W is a larger one of widths of $F_T$ and $F_S$.

17. The device according to claim 16, wherein the processor executes the at least one machine executable instruction to iteratively train the student network using the training sample data, the at least one machine executable instruction being executed by the processor to interpolate $F_T$ and $F_S$ according to H and W.

18. The device according to claim 16, wherein the teacher network performs same functions of the student network.

* * * * *